(12) United States Patent
Moore

(10) Patent No.: US 6,477,145 B1
(45) Date of Patent: Nov. 5, 2002

(54) METHOD AND APPARATUS FOR USING VIDEO MEMORY TO BUFFER DATA PACKETS FOR PRESENTATION TO A DATA NETWORK

(75) Inventor: Gregory D. Moore, Anchorage, AK (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/223,053

(22) Filed: Dec. 30, 1998

(51) Int. Cl.[7] ................................................ H04J 11/00
(52) U.S. Cl. ...................... 370/231; 370/235; 370/349; 370/352
(58) Field of Search ................................ 370/229, 230, 370/231, 232, 233, 234, 235, 236, 349, 352, 389

(56) References Cited

U.S. PATENT DOCUMENTS

| | | | |
|---|---|---|---|
| 5,313,454 A | | 5/1994 | Bustini et al. |
| 5,434,850 A | | 7/1995 | Fielding et al. |
| 5,600,798 A | * | 2/1997 | Cherukuri et al. ...... 395/200.13 |
| 5,633,869 A | | 5/1997 | Burnett et al. ............... 370/396 |
| 5,734,830 A | * | 3/1998 | Balogh et al. .......... 395/200.38 |
| 5,790,553 A | | 8/1998 | Deaton, Jr. et al. |
| 6,160,793 A | | 12/2000 | Ghani et al. |
| 6,167,029 A | | 12/2000 | Ramakrishnan |
| 6,198,722 B1 | | 3/2001 | Bunch |
| 6,208,619 B1 | * | 3/2001 | Takeuchi ..................... 370/229 |
| 6,269,099 B1 | * | 7/2001 | Borella et al. ............... 370/389 |

OTHER PUBLICATIONS

Fred Baker, "Mitigating Latency In High Delay Data Networks", Cisco Systems, INET 1997 Satellite Networking Workshop, pp. 1–53.

* cited by examiner

Primary Examiner—Hassan Kizou
Assistant Examiner—Tim Spafford

(57) ABSTRACT

Router for initiating a data flow control comprises a receiving protocol stack, a controller and an operating system. The controller is programmed to respond to receipt of a congestion message from a fast packet network such as a frame relay or cell relay network to generate a pass through packet message requesting the opening of a virtual data flow control channel between layer N and layer N+2, where typically layer N is layer 2 of a frame relay protocol and layer N+2 is layer 4 of a TCP protocol. Layer 4 may refuse to open the channel, but once a channel is opened, data flow control may be initiated between destination intelligent terminals when congestion is sensed in the fast packet network. Data packets for presentation to a data network can be advantageously stored in buffer memory, which preferably includes unused or otherwise available video display memory.

20 Claims, 10 Drawing Sheets

FIG. 9

| 8 | 7 | 6 | 5 | 4 | 3 | 2 | 1 | |
|---|---|---|---|---|---|---|---|---|
| FLAG<br>0 1 1 1 1 1 1 0 ||||||||  OCTET 1 |
| ADDRESS (msb) ||||||||  OCTET 2 |
| ADDRESS (lsb) ||||||||  OCTET 3 |
| USER DATA FIELD<br>(INTEGRAL NUMBER OF OCTETS) ||||||||  OCTET 4<br>⋮<br>OCTET n-3 |
| FRAME CHECK SEQUENCE<br>(FCS) (msb) ||||||||  OCTET n-2 |
| FRAME CHECK SEQUENCE<br>(FCS) (lsb) ||||||||  OCTET n-1 |
| FLAG<br>0 1 1 1 1 1 1 0 ||||||||  OCTET n |

FIG. 10

COMMAND/RESPONSE INDICATION BIT

| 8 | 7 | 6 | 5 | 4 | 3 | 2 | 1 | |
|---|---|---|---|---|---|---|---|---|
| DLCI (msb) |||||| C/R | 0 | OCTET 2 |
| DLCI (lsb) |||| FECN | BECN | DE | 1 | OCTET 3 |

US 6,477,145 B1

METHOD AND APPARATUS FOR USING VIDEO MEMORY TO BUFFER DATA PACKETS FOR PRESENTATION TO A DATA NETWORK

BACKGROUND OF THE INVENTION

1. Technical Field

This invention relates to traffic control signaling in a fast packet network carrying Internet protocol packets and, more particularly, to the initiation of flow control signaling between layers one and two of a fast packet protocol such as the frame relay protocol and layers three, four or five of an Internet protocol such as the TCP/IP protocol upon receipt of a congestion message.

2. Description of the Related Arts

Referring to FIG. 1, there is shown an overview of a known fast packet network, for example, a frame relay or cell relay network, that is carrying packet data traffic between customer locations. By frame is intended a larger data carrying capacity within a single entity than a cell. A cell may comprise one or more data packets. The stacks 101 and 102 at the left and right respectively indicate stacks from the known open systems interconnect (OSI) model for describing layers of potential data transmission. Typically, customer applications software 103 runs on, for example, a personal computer workstation, labeled customer computer at location A or CCA and customer applications software 104 runs on the customer computer at location B or CCB. These talk to each other over the fast packet network at various levels of communication. The customer computer may be any intelligent communications terminal device having a controller and memory.

At level 1, there exists, for example, communication over a local area network (LAN) cable between the computer workstation CCA, CCB and the router 105, 106, for example, an ACT Networks SDN-9300 or other router known in the art. The router 105, 106 is connected via the CSU/DSU interface card 106, 107 to a time division multiplex (TDM) link to a comparable network's CSU/DSU interface card 108, 109. Typically, the area represents the facilities of an interexchange carrier 112 such as AT&T and are shown in greatly simplified form. At the edge of the IEC network may be a frame relay router 110, 111 which may, for example, comprises an ACT Networks SDM-9400 or SDM-9500 or other router known in the art. In between these edge switches, not shown, may be a satellite uplink, not shown and other intermediate switches.

At layer 3, is the Internet Protocol (IP) layer. The workstation CCA or CCB communicates with the respective router 105, 106. There is no Internet protocol or TCP protocol communication within the fast packet portion of the network 112. At layers 4 and 5, the TCP protocol operates and at layers six and seven, the http.ftp.telnet high level protocol operates. These layers are strictly between work stations CCA and CCB.

Consequently, starting at the 7 layer computer CCA or CCB, each stack of protocols can be understood as executing software process on the individual network element depicted. For example, the complete 7-layer stack executing on the computer may, in actuality, be, for example, an inetd daemon applications package 103 operating under the UNIX operating system or a comparable package operating under a Microsoft Windows operating system or other system known in the art to provide protocol-based end-to-end communications services. The flow of data in the network is from applications software 103 all the way across the network to applications software 104.

The exchange of protocol-based control information in such a network is peer to peer. For example, if the TCP protocol processes on work station CCA exert flow control on the data stream, then it is exchanging flow control information with its peer TCP process on work station CCB. The same thing is true for IP and http and so on.

The IEC fast packet, for example, frame or cell relay transport is shown in the shaded area of FIG. 1. As already indicated, there could be many, or as few as two, edge switches. Transport of fast packet data is at layer 2; the frame relay protocol is between routers and may be I.E.E.E standard 802.3 logical link control (LLC) from the router 105, 106 to the work station CCA or CCB. Layer 2 is where flow control is exerted in a fast packet network, not at a higher layer such as layer 4 as in TCP.

Now referring to FIG. 2, similar reference characters are used to denote similar elements. There is shown a similar figure emphasizing one end, for example, the CCA end of the network of FIG. 1 and with arrows shown designating what happens in the event of traffic congestion in the fast packet network. The X signifies the sensing of congestion at a frame relay switch within a fast packet network such as the AT&T frame relay network 112. A key at the top of the drawing indicates the interface between the IEC and the premises equipment.

Starting at the 7-layer computer CCA, outbound traffic traverses the router 105 and then may encounter congestion at the second network switch 201. When congestion is sensed in a fast packet network, it is known to originate congestion messages at level 2 in a forward and backwards network direction. The forward congestion message FECN proceeds to the right (forward) and the backwards congestion message proceeds to the left (backward) by setting a bit within the cells or packets known as the FECN and BECN respectively to 1. For example, when congestion is noted, the forward message has FECN equal to 1 and BECN equal to 0. The backward message has FECN equal to 0 but the BECN equal to 1. Following the path of the BECN message, the message is passed by the edge switch 110 to the router 105. The edge switch 110 is not programmed at all to react to the BECN message. Presently, the router 105 strips or discards the BECN message. The router 105 is, like the edge switch 110, not presently programmed to react at all to the receipt of a congestion message. The fast packet protocols, including the frame relay protocol, are silent on what the end router is to do with the congestion message or any action to take. Congestion continues and dropped frames, cells and packets occur until the TCP layer finally senses longer acknowledgment times and/or missing packets. The TCP layer, being the first layer that is end-to-end or peer to peer, is the first to react but is a layer that controls the presentation of data to the user at their work station and from the executing computer process 103 to the network. A layer 4 process may be executing on the router 105, but such a process is also typically passive to congestion at layer 2. Enhanced layer 4 functions are known, for example, firewall functions, but these are not flow control functions. In the typical case, the layer 4 router process is passive and so is not shown. In summary, it is believed that according to prior art processes, there is no slowing of data presentation to the network at workstation CCA even though network congestion is sensed at a frame relay switch 201 of the network and, eventually, frames (cells) are dropped due to the congestion.

Recently, the United States federal government has enacted legislation to encourage the delivery of Internet services to remote school districts, for example, that may only be reached by satellite. Examples of such school districts may comprise outlying Indian villages in rural Alaska, whose only telecommunications service is via satellite. Satellite introduces absolute delay into any data path due to the length of time it takes to travel to and from a geosynchronous satellite. Flow control becomes more acute because of this delay which would be experienced in a prior art flow control scheme where reliance on layer 4 TCP flow control measures is the only alternative. Data latency can consequently vary but may be typically increased from a latency on the order of a quarter to a half a second to a second to a second and a half. Latencies may typically be on the order of 900 milliseconds, so a fast reacting congestion alleviation scheme is desirable. Digital cell relay networks appear to be an economical and viable approach to providing such services and other data services as well such as telemedicine services at 56 or 64 kbps. It will be advantageous in the art if data flow control were provided in such networks especially those involving satellite links.

The obvious problem for customers of the interexchange carrier or other provider of frame relay services is dropped frames, cells or packets due to delays in implementing any data flow control. It is believed that there exists no method of signaling flow control between layer 2 and layer 4 from a network element to a network element. Consequently, TCP/IP traffic cannot flow smoothly or efficiently over a fast packet network, especially one involving satellite service delivery, according to the state of the art even though congestion sensing processes are known and congestion messages exist for signaling in a fast packet network.

SUMMARY OF THE INVENTION

The problems and related problems of the prior art flow control processes are solved according to the principles of the present invention by providing flow control signaling between layer 2 and layer 4 at a router. For example, at an edge router or switch, the router is programmed to react upon receipt of a congestion message received from a switch within the fast packet network that has sensed a traffic congestion. The frame relay edge switch (or router) generates a request of the router to open a virtual control channel to the TCP layer on the router. As used in the claims and in the present description, a router is intended to encompass either a router or a switch as is commonly used in the art. Once opened, the virtual control channel at the router is operative to throttle the congestion. The present application is associated with the initiation of the flow control signaling between the edge switch and the router. In the present application, the signaling path that is opened up will be referred to as a reverse pass through packet control channel to conform with the direction of congestion message described, that is, a backwards or BECN congestion message. By convention, an N+2 pass through packet channel request message received at a destination switch will operate in response to a FECN message to open a forward pass through packet control channel. If the edge switch passes the BECN to the router, the router may be similarly programmed to react and open a control channel. Related concurrently filed applications, Ser. Nos. 09/224,204; 09/223,319; and 09/223,502 by the same inventor, Gregory D. Moore, hereafter incorporated by reference herein, discuss the operation of the router and the work station in response to the initial request which is referred to herein as an N+2 pass through packet (PTP) (N+2 PTP) request message.

Once the TCP virtual control channel is open, the edge switch (or router) then initiates an N+2 fair queue (N+2 FQ) message or control signal to signal the work station to "slow down" the presentation of packets to the network. The edge switch 110 or the router may generate the fair queue telemetry message which causes slow down of data egress to the edge switch 110 of the network. The established N+2 PTP channel allows the telemetry data to pass to layer 4 of the router 105 where the slowing down can occur. The layer 4 process on the router responds by slowing down the presentation of data to the network originating from layer 4 downward. The layer 4 process on the router then propagates a pass through packet "slow down" message to the layer 4 process executing on the work station. Frames may be buffered at the work station, the router or the edge switch. Receipt of a BECN causes slowdown of data ingress to the network. Frames inbound to the edge switch 110 from router 105 may be buffered at the edge switch 110.

Eventually, the congestion message BECN signaled by congested switch 201 to the edge switch 110 will clear; that is, the BECN bit will be restored to 0. This indicates an uncongested network condition and the edge switch generates an N+2 FQ control signal to speed up the presentation of data. The layer 4 process executing on the router responds by asking the work station to increase the rate of data presentation to the network. The router may also generate a pass through packet "speed up" message to the layer 4 process executing on the work station. In the work station itself, it is suggested that a buffer memory be provided for storage of packets held for presentation to the network during periods of congestion. One possible memory area for such a purpose may be the unused video memory associated with the computer display.

These and other features of the present invention will be discussed in connection with the following drawings.

BRIEF DESCRIPTION OF THE DRAWINGS

FIG. 9 provides an overview of a data frame according to the frame relay protocol.

FIG. 10 provides an overview of the address data field of FIG. 9 containing data link connection identifier fields of interest to the present application including forward (FECN) and backward (BECN) explicit congestion notification bit positions.

DETAILED DESCRIPTION

Figure 3:
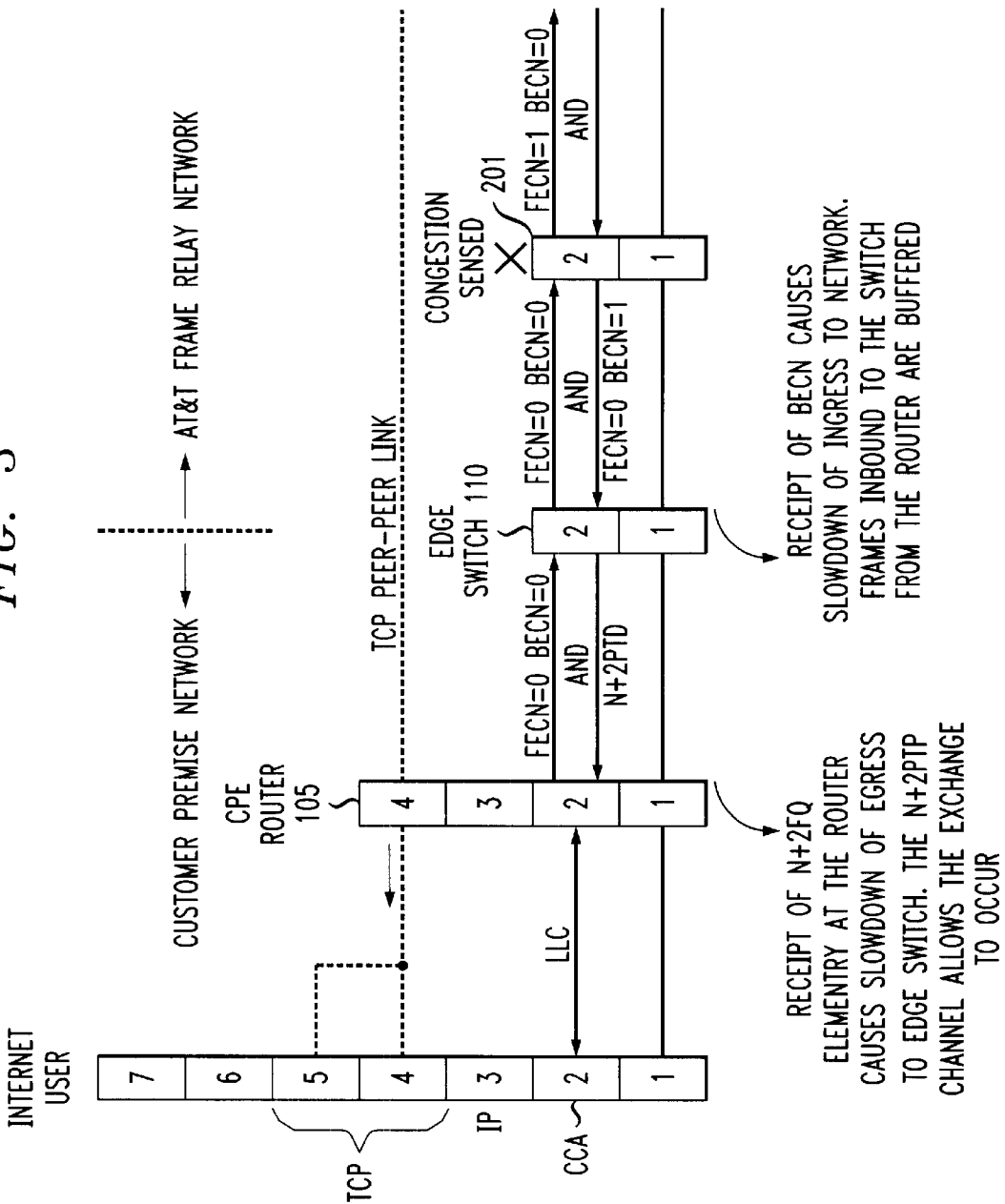
FIG. 3 provides an overview of the N+2 pass through packet flow control message generated at an edge switch for signaling equipment to open a flow control channel.

Referring to FIG. 3, there is provided an overview of the flow control signaling of the present invention. FIG. 3 shows an interexchange or local exchange carrier fast packet network 112 such as the AT&T frame relay network and a network that may be assumed to comprise a premises network. The depicted example is merely exemplary and is not intended to show every example of a network structure in which the present invention may be utilized. Congestion is sensed internal to a network and may be sensed anywhere within a fast packet network, prior to or after a satellite link, if a satellite link is involved at all. By way of example, congestion is sensed at fast packet switch 201 in a known manner and, in a known manner, a backward explicit congestion notification bit (BECN) bit is set to one and transmitted toward equipment CCA and, in a known manner, a forward explicit congestion notification bit (FECN) bit is set to 1 and transmitted toward a destination not shown. According to the principle of the present invention, a response must be generated at an edge switch or router in order for end-to-end flow control to occur. For example, in an edge router or switch 110, the router 110 is programmed to react upon receipt of a congestion message received from a switch 201 within the fast packet network 112 that has sensed a traffic congestion. The frame relay edge switch 110 generates a request of the router 105 to open a virtual control channel to the TCP layer on the router. In an alternative embodiment, the router itself may react to the BECN message if it has been passed the BECN message by the edge switch. However, the present invention will be discussed in the embodiment where the edge switch recognizes the BECN bit change and reacts to open a virtual control channel. Once opened, this channel is operative to throttle the congestion. The present application is associated with the initiation of the flow control signaling between the edge switch 201 and the router 110 or at the router 105.

If the edge switch 110 passes through the BECN to the router 105, the router may be similarly programmed to react and open a control channel in the other embodiment, note described further. Related concurrently filed applications Ser. Nos. 09/224,204; 09/223,319; and 09/223,502 by the same inventor, Gregory D. Moore, hereafter incorporated by reference herein as to their entire contents, discuss the operation of the router and the work station in response to the initial request which is referred to herein as an N+2 pass through packet (N+2 PTP) request message. This message may be referred to as a communications channel request message and an N−2 PTP channel referred to as an answer channel; that is, what does the equipment use to react to any congestion indication.

FIGS. 9 and 10 are provided for illustrating the field format of a frame relay frame as necessary and the placement of the FECN and BECN bits in the address fields of a frame according to the frame relay protocol standard. Upon receipt and recognition of a congestion bit, the frame of FIG. 9 is copied and stored in its entirety for operation thereon. Conveniently, the frame may be temporarily stored and then discarded when the next frame with a congestion message is received. The first three bytes are preserved and include address data and, per FIG. 10, the FECN and BECN. The next data of the frame is a user data field of length octet 3 to n−3 where n is an integral number of octets. The N+2 PTP message may be located, for example, in the 28 bytes following the first 36 bytes of the user data field which are cleared. A pass through bit being set in the N+2 PTP message indicates that the protocol stack layer should pass the message to the next protocol stack layer. For example, when the PTP bit is set, the layer 3 passes the message to layer 4. The object is to replace a substantial portion of the user data field with the N+2 PTP message. Once received at layer 4, the header and tail encapsulated PTP message is used to establish a channel to the work station CCA.

Once the TCP virtual control channel is open, the edge switch 110 (or router 105) initiates an N+2 fair queue (N+2 FQ) message or control signal to signal the work station CCA to "slow down" the presentation of packets to the network. The layer 4 process on the router 105 responds by slowing down the presentation of data to the network originating from layer 4 downward. The layer 4 process on the router then propagates a pass through packet "slow down" message to the layer 4 process executing on the work station CCA.

When N+2 fair queuing is in use, the size of a TCP/IP congestion window is intentionally decreased to slow down packet generation. This means that a buffer memory will have to be used for the extra, unsent packets until they can be sent. If BECN continues in the present example, the next pass through packet will continue to decrease the size of the TCP/IP congestion window. To the contrary, when the BECN messages stop, that is, the BECN bit reverts to a 0, a pass through packet will signal that the congestion window may be opened up again in increments. For example, a multiplier is used to decrease the size of the window in increments of, for example ½, ¼ then ⅛ of its initial size in response to a N+2 FQ message.

Eventually, the congestion message BECN signaled by congested switch 201 to the edge switch 110 will clear; that is, the BECN bit will be restored to 0. This indicates an uncongested network condition and the edge switch 110 (or the router 105 in the alternative embodiment) generates an N+2 FQ control signal to speed up the presentation of data. Once the BECN's stop, the size of the window is incrementally increased via the N+2 FQ control signal until BECN's again appear and so on until the communications session ends. Of course, a similar process occurs at the destination terminal in response to FECN bit messages and changes. The layer 4 process executing on the router 105 responds by asking the work station CCA (or CCB) to increase the rate of data presentation to the network. The router 105 may also generate a pass through packet "speed up" message to the layer 4 process executing on the work station CCA (or CCB). In the work station CCA itself, it is suggested that a buffer memory be provided for storage of packets held for presentation to the network during periods of congestion. One possible memory area for such a purpose may be the unused video memory associated with the computer display. This opportunity will be further described in connection with FIGS. 7 and 7A. The overview of FIG. 3 will now be further described in connection with FIGS. 4–6.

Figure 4:
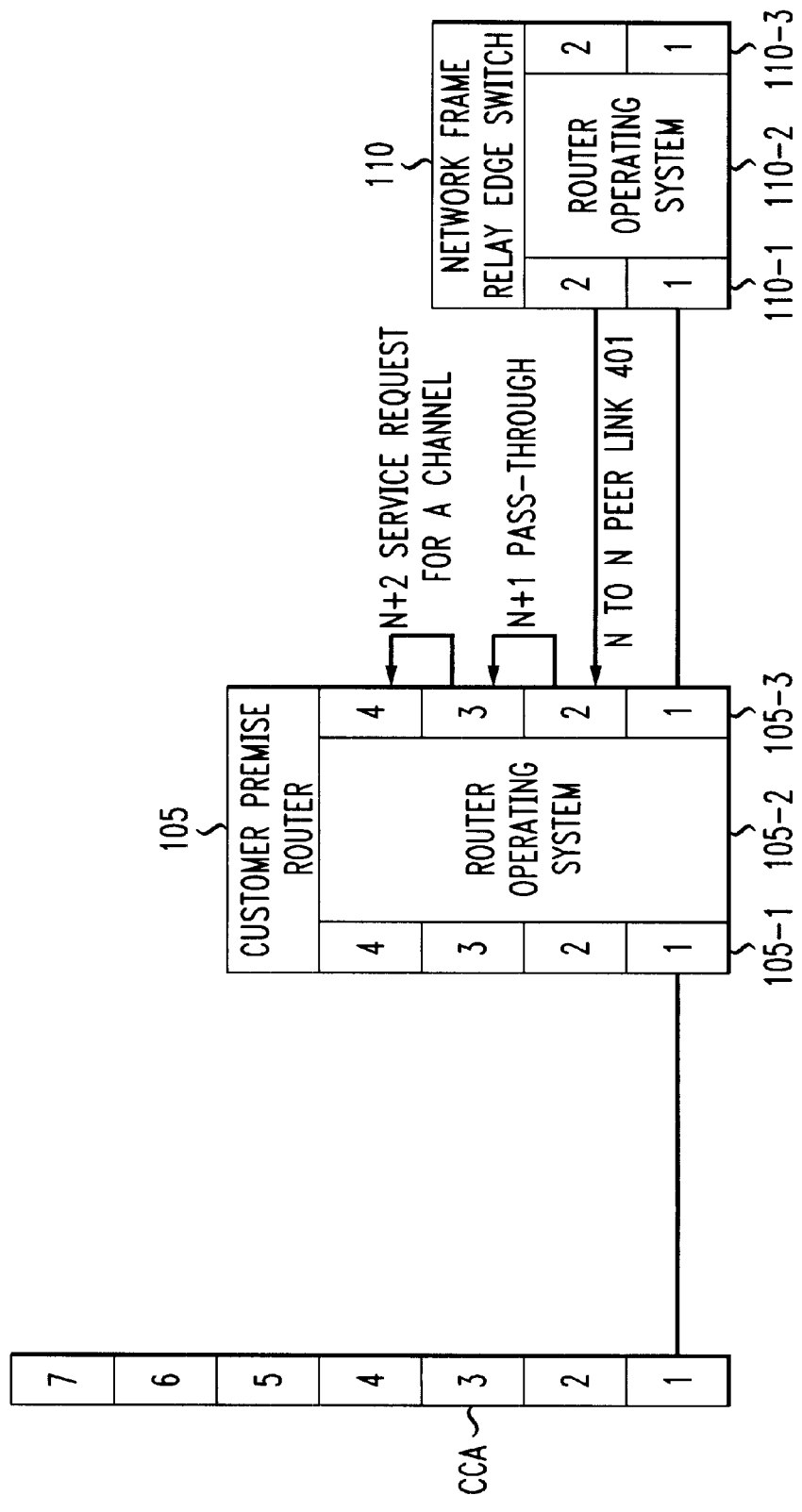
FIG. 4 provides further detail of the response by a router to an N+2 pass through packet control message showing the delivery at layer 4 of the of the request for a control channel.

Referring to FIG. 4, the premises router 105 and network frame relay edge switch are shown in greater detail. Routers typically include a controller for controlling the switching or packet routing and signaling processes. Such controllers typically have associated program storage and an operating system that operates at all protocol layers. The inbound and outbound protocol stacks of the routers are generically shown. For example, premises router 105 may have an inbound side 105-1 for receiving traffic from workstation CCA and an outbound side 105-3 controlled by an operating system 105-2 that reaches all layers of the protocol stack. This operating system and applications software running thereon is utilized in the present invention for generating appropriate flow control signaling messages.

Figure 2:
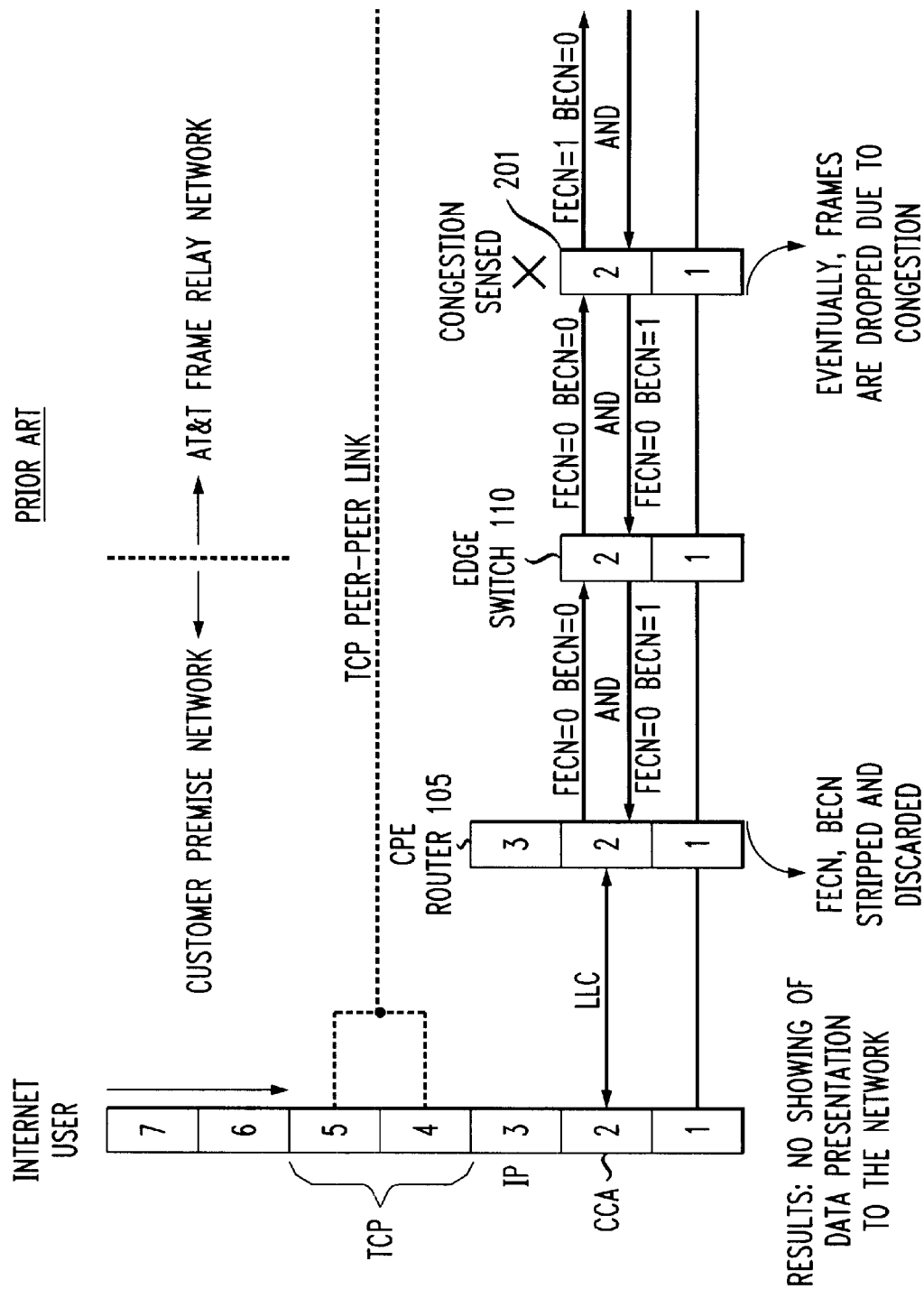
FIG. 2 provides further detail of one end of FIG. 1 to demonstrate flow control measures in a fast packet network where a congestion message may be generated when congestion is sensed but an edge switch or router may ignore such a message and in actuality strip and/or discard the message.

When a change of a BECN message bit from 0 to 1 is recognized, for example, at the edge switch, having received the same from a frame relay router in the network (not shown), but, for example, switch 201 in FIG. 2, the edge switch (or router) is programmed to react to the change in BECN bit value. The network switch 110 seeks to open an N+2 pass through packet control channel with the N+2 layer on the router 105. Normally, layer N on the edge switch 110 would not directly transact with layer N+2 on a router. Moreover, on a router 105, in receipt of a BECN message, the router 105 would not normally react with layer N+2. As a result, the hope of an initial message is the establishment of a temporary control channel between layer 2 and layer 4. There may be circumstances under which the router 105 may refuse N to N+2 control. Opening a temporary control channel offers the targeted router 105 the opportunity to refuse the establishment of a temporary control channel. Each of the layer to layer transactions as a temporary control channel is requested operates, for example, as a composition of parameter.primitive exchanges. Other ways of signaling N+1 may come to mind of one of ordinary skill in the art.

In particular, edge switch 110 transmits an N+2 PTP protocol data unit (PDU) over the N to N peer to peer link 401 to the router 105-3 protocol stack. The operating system 105-2 recognizes the PDU and acts as follows. At the router 105, the N+2 PTP PDU is passed through to layer N+1 of stack 105-3 with no action taken by the router 105. Then, at layer N+1 on the router 105, the N+2 PTP PDU is passed to layer N+2 in the standard manner as a service.request would be handled. The operating system 105-2 at layer N+2 has the option of accepting the requested control channel or refusing it. Certainly, it would be desirable, if the control channel is accepted and established. If the service.request is granted, the control channel is opened. No specific control telemetry is passed in this embodiment. N+2 pass through packet control only relates to the initial step of opening a control channel between layer N and layer N+2, for example, between protocol stack layers 2 and 4. This is a one direction channel. A similar channel is required for flow control signaling in the opposite direction.

Figure 5:
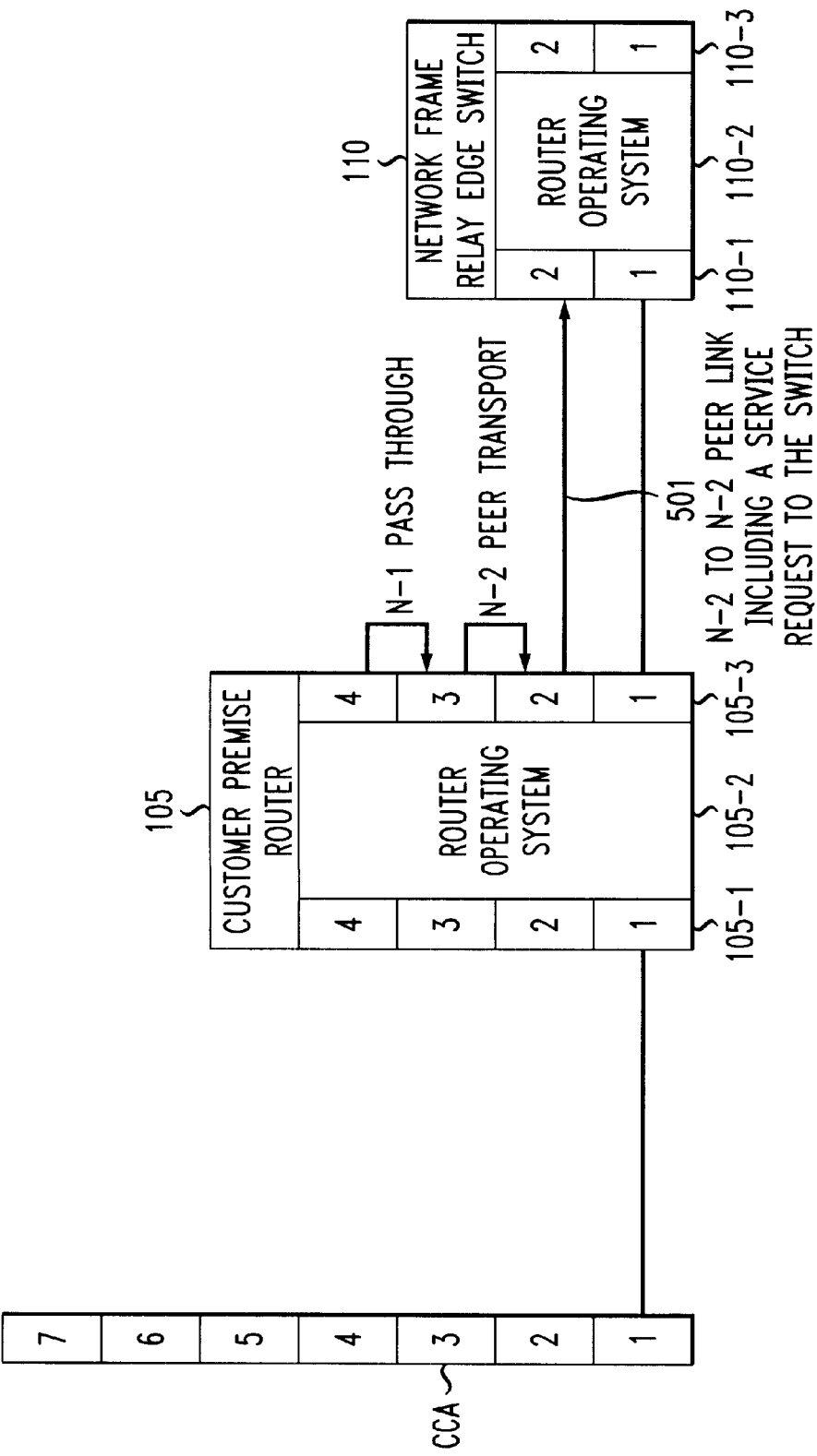
FIG. 5 provides an overview of the response by the router once the control channel is opened and the delivery of a service. request message to the edge switch via an N–2 pass through packet channel.

Referring to FIG. 5, there is shown an overview of requesting a flow control channel between layer N+2 and layer N or an N-2 pass through packet. In FIG. 5, the router 105 is opening an N-2 pass through packet (PTP) control channel with the N-2 layer on the router 105 and the network switch 110. Normally, layer N, for example, here layer 4, on a router does not directly transact with layer N-2, let alone, layer N-2 on a network switch 110. As before, just a temporary control channel is desirable. As before, also, there may be circumstances under which the router or the network switch are not programmed to do anything and may refuse the N to N-2 control channel request. As before, opening a temporary channel within the router offers the target device, in this case, the edge switch 10, the opportunity to refuse the channel. As before, each of the layer to layer transactions within the router 105 is composed, for example, of parameter.primitive exchanges.

An N-2 PTP protocol data unit (PDU) is transmitted to layer N-1 or from layer 4 to layer 3. At layer N-1 (or at level 3 of the protocol stack 105-3), no action is taken by the router 105. The N-2 PTP PDU is received at layer N-1 and then forwarded down another layer to layer N-2. Now at layer N-2 (or layer 2 of stack 105-3), the N-2 PTP PDU is transmitted over the peer to peer link 501 in the direction from router 105 toward edge switch 110. For example, this may be a service.request message that edge switch 110 may refuse or accept. At the network switch 110, layer N-2 (or layer 2 of stack 110-1) has the option of either accepting or refusing the establishment of the control channel. As with router 105, switch 110 is run by a controller having an operating system 110-2 and applications software for routing and signaling control. No specific control telemetry is passed, N-2 PTP has only to do with opening a forward control channel path, typically after a reverse or backwards control channel is originated as described in connection with FIG. 4. The present forward control channel is utilized whenever the work station CCA or router 105 wishes to acknowledge action taken at the workstation or router. The backwards control channel is, for example, utilized to enable a throttling action to begin at a workstation.

Figure 6:
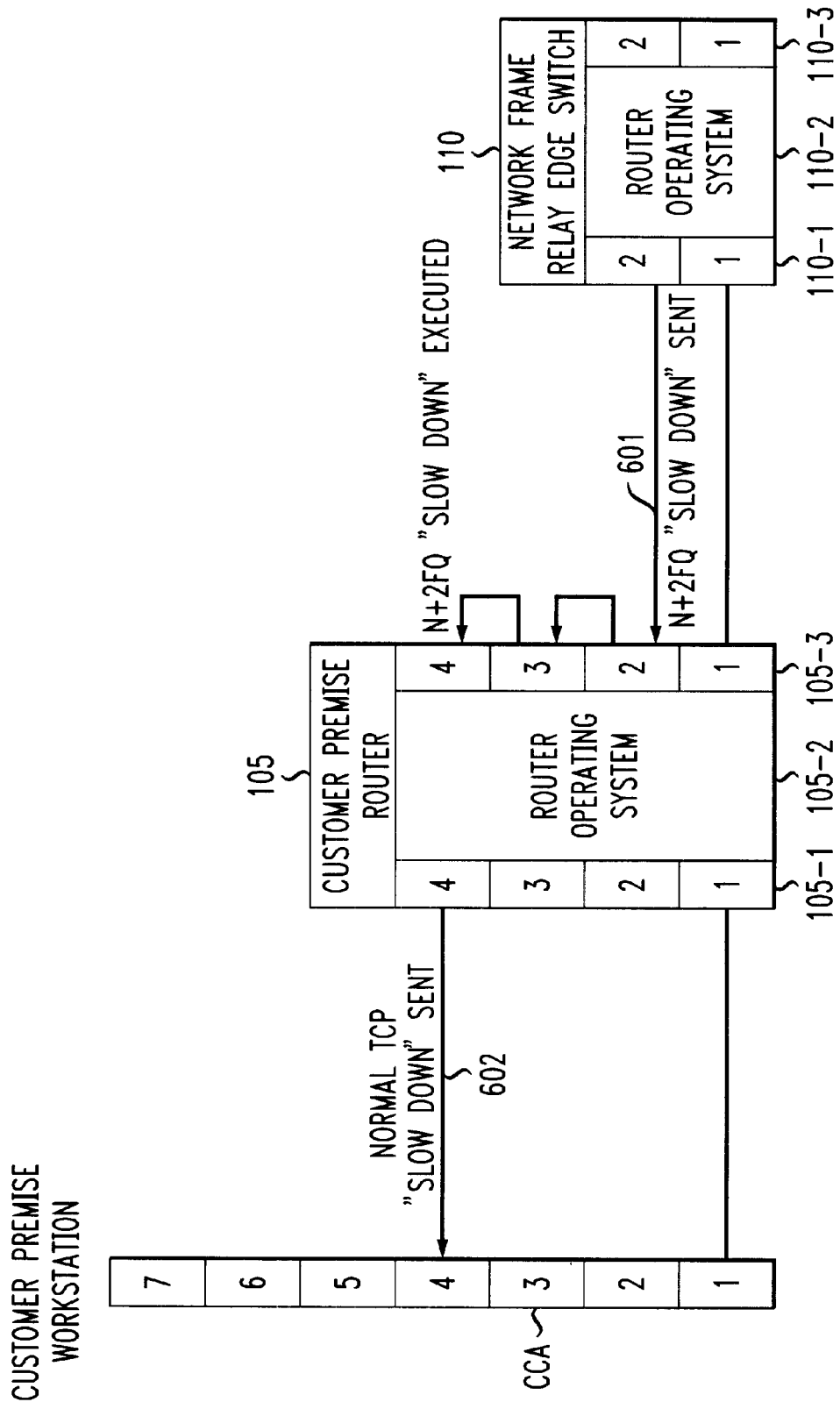
FIG. 6 provides an overview of the router's reaction to an N+2 fair queue message, for example, to slow down presentation of data to the network.

FIG. 6 describes the generation of a request of the workstation CCA by the router 105, for example, to slow down the delivery of data to the network over the backward virtual flow control channel established in FIG. 4. Having previously opened an N+2 PTP control channel, the network switch 110 generates an N+2 Fair Queue protocol data unit (PDU) containing flow control telemetry equivalent to a signal to "slow down." Any such flow control telemetry may be so designed so long as the router 105 is programmed to receive it. Normally, a router 105 is not programmed nor would such a router accept flow control telemetry from layer N on a network switch 110 via a peer to peer link 601. According to the present invention, the software operating on operating system 105-2 is programmed to receive the message and accordingly outputs a message at layer 4 to a work station to slow down data presentation at layer N+2. One way of implementing a slow down is by regulating internal timers of the router (not shown) to TCP at layer 4 on the router. According to FIG. 6, a TCP "slow down" message is transmitted by router 105 at layer 4 to signal the work station CCA to slow down.

Having accomplished an initial slow rate of data presentation, a regulation must occur. The router must equalize or "fair" its own queue of data by propagating a control message to the workstation CCA. Since an adjustment has been made to timers internal to the TCP protocol, no special measures are required. The change in timer settings is propagated normally on the peer-to-peer link 602, layer 4 to layer 4, from the router 105 to the workstation CCA. Workstation operating system is not shown in FIG. 6, nor software operating thereon. The network protocol stack executing on the computer operating system of workstation CCA accepts the timer message and in a normal fashion, slows down the presentation of data from the computer workstation CCA to the router 105. The computer workstation CCA has been fooled into believing that a control message has been propagated all the way across the network from its companion workstation (for example, workstation CCB) on the communications session. Of course, the congestion indication in fact originated with receipt of a fast packet network congestion message at a protocol level TCP is not believed to communicate with.

Figure 7:
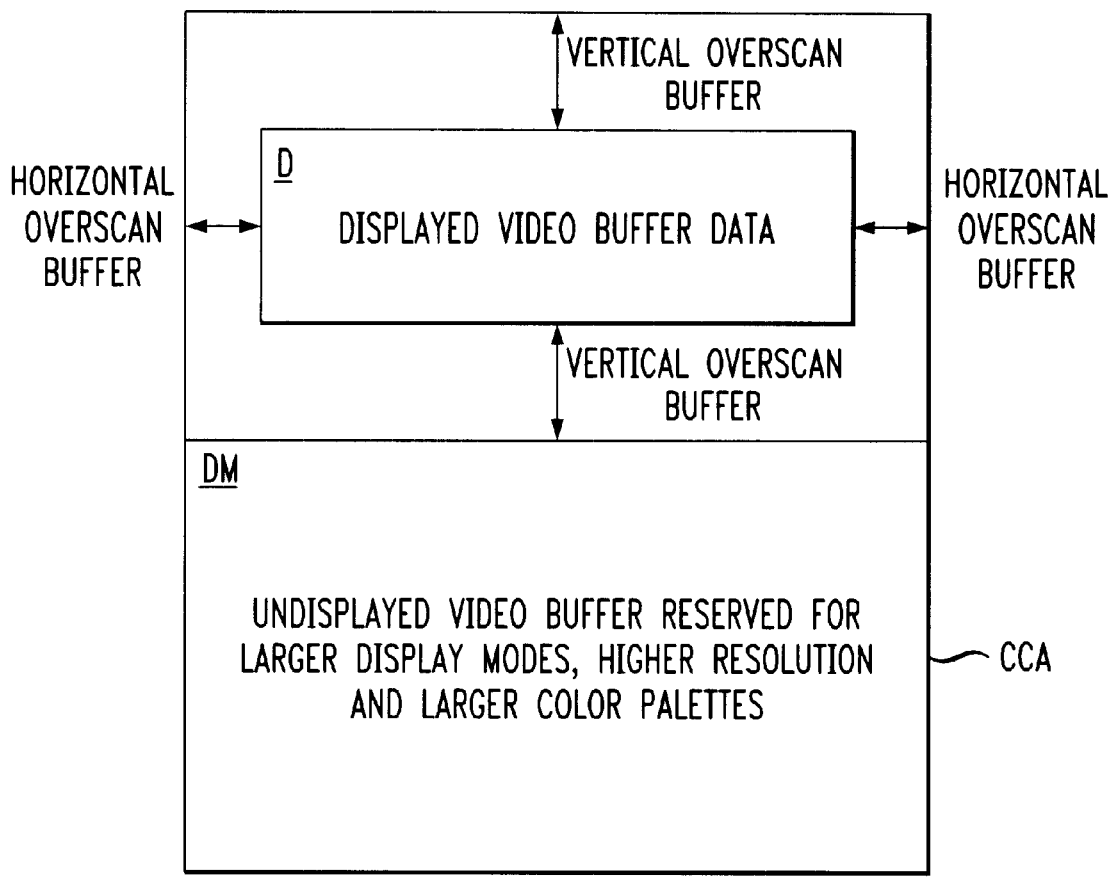
FIG. 7 provides an overview of a queue that may be established in premises equipment for buffering packets that have been slowed down for presentation to the network during flow control measures according to the present invention wherein the suggested buffering memory is provided via unused video memory or other buffer memory.

FIG. 7 relates to the problem of providing buffer memory for data packets awaiting presentation to the network. Of course, some of these data packets would normally be lost in prior art networks without any programming to provide inter-layer flow control signaling. FIG. 7 shows, in block diagram form, the organization of dynamic random access memory or other video display memory (DM) used in most computer display systems. Other memory that is not exclusively video memory might be used as buffer memory but it is believed that video buffer memory may be utilized without loss of perceived memory capacity to a user of a workstation CCA. Particularly in large servers used with data communications, the display memory DM for the omnipresent video display D is underutilized, leaving large areas of random access memory available for other uses. According to the present invention, the use of unused video display memory DM for network fair queuing of the kind described above in connection with FIG. 6 is recommended although other buffer memory may be so utilized.

In addition to the video and other memory of a work station, some routers and/or edge switches might also include video and other memory that might be used for storing data packets to and/or from a data network. Such buffer memory might be used for storing data and/or data frames for presentation to and from a frame relay network. Those skilled in the art will recognize that a work station or comparable computer might be programmed to function as a router. Such a router might include its own video displays and accordingly its own video display memory. Unused video display memory and/or portions thereof, if any, might also be used to buffer data and data packets. Such video memory might be used to buffer the transmission/ presentation of data packets so long as the video memory is appropriately coupled or linked (operatively) coupled to the data unit or other data source.

Figure 7A:
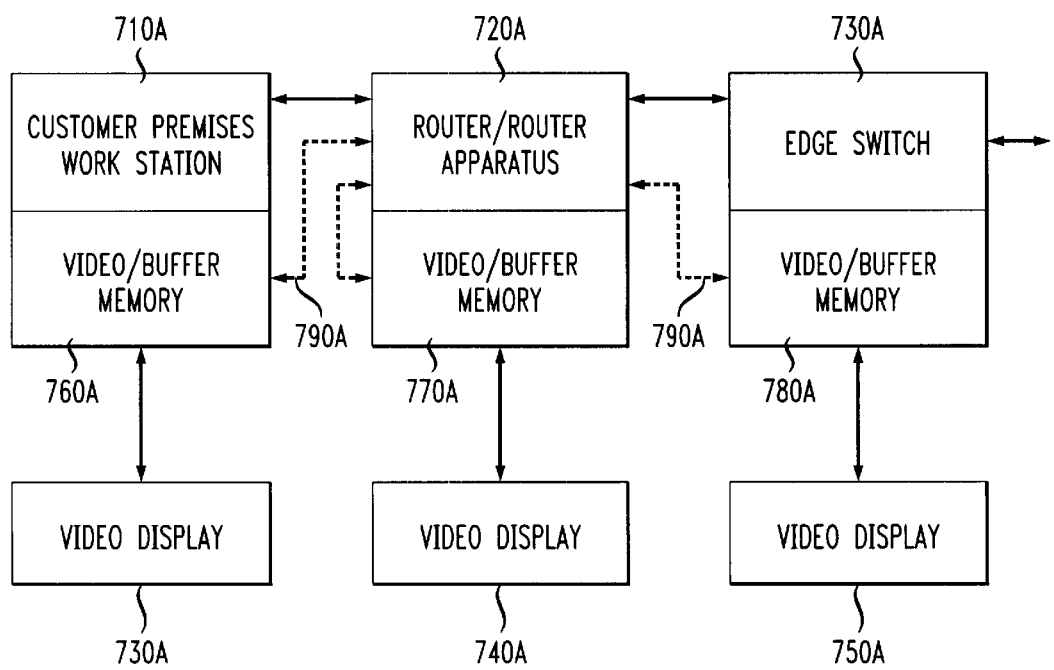
FIG. 7A provides a simplified block diagram of how video memory in a router, edge switch and/or premises work station might be utilized to store data and data packets for presentation.

FIG. 7A depicts simplified block diagrams of a premises work station (710A) a router (as described elsewhere herein but identified in FIG. 7A by reference numeral 720A) and an edge switch (730A) for use with a data network and the invention described herein. Each of the devices shown in FIG. 7A is shown with a video display device (730A; 740A; 750A) such as a well-known video monitor, and corresponding video display or buffer memory (760A; 770A; 780A) to support the corresponding video display devices. Data packets for presentation to a data network (not shown in FIG. 7A) but which need to be buffered (temporarily stored) might be buffered/stored in the video memory or other buffer memory of any (or all) of the devices as shown. Direct connections between the router (720A) might be made to the video/buffer memories (760A; 770A; 780A) whereby data might be written to and read from such memory. Alternatively, virtual connections might be made to the video memory via the aforementioned connections between the router and the work station and edge switch (790A).

Figure 1:
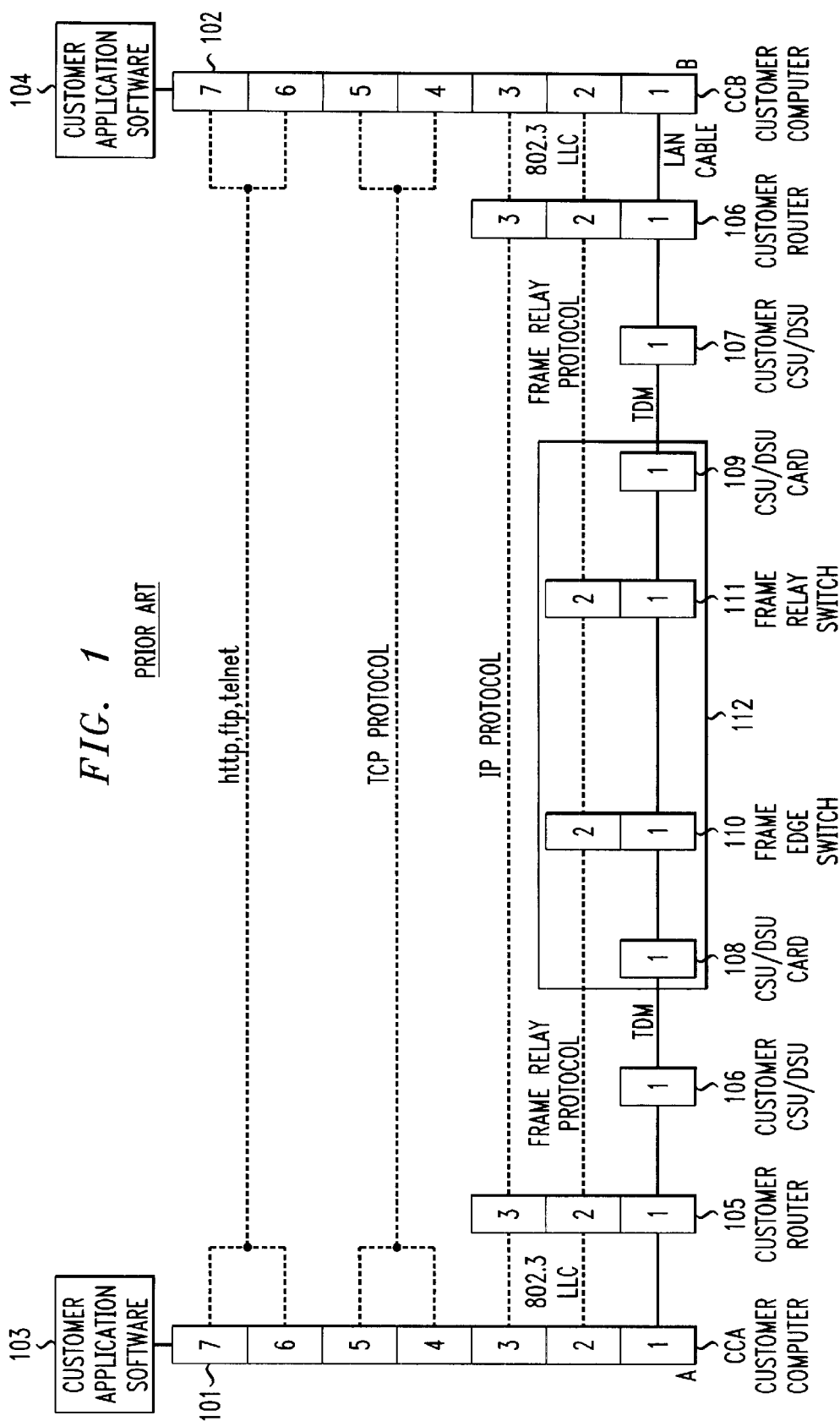
FIG. 1 is a generalized fast packet data network showing end to end signaling at the various layers of a known open systems interconnect protocol stack useful in describing present flow control measures.
Figure 8:
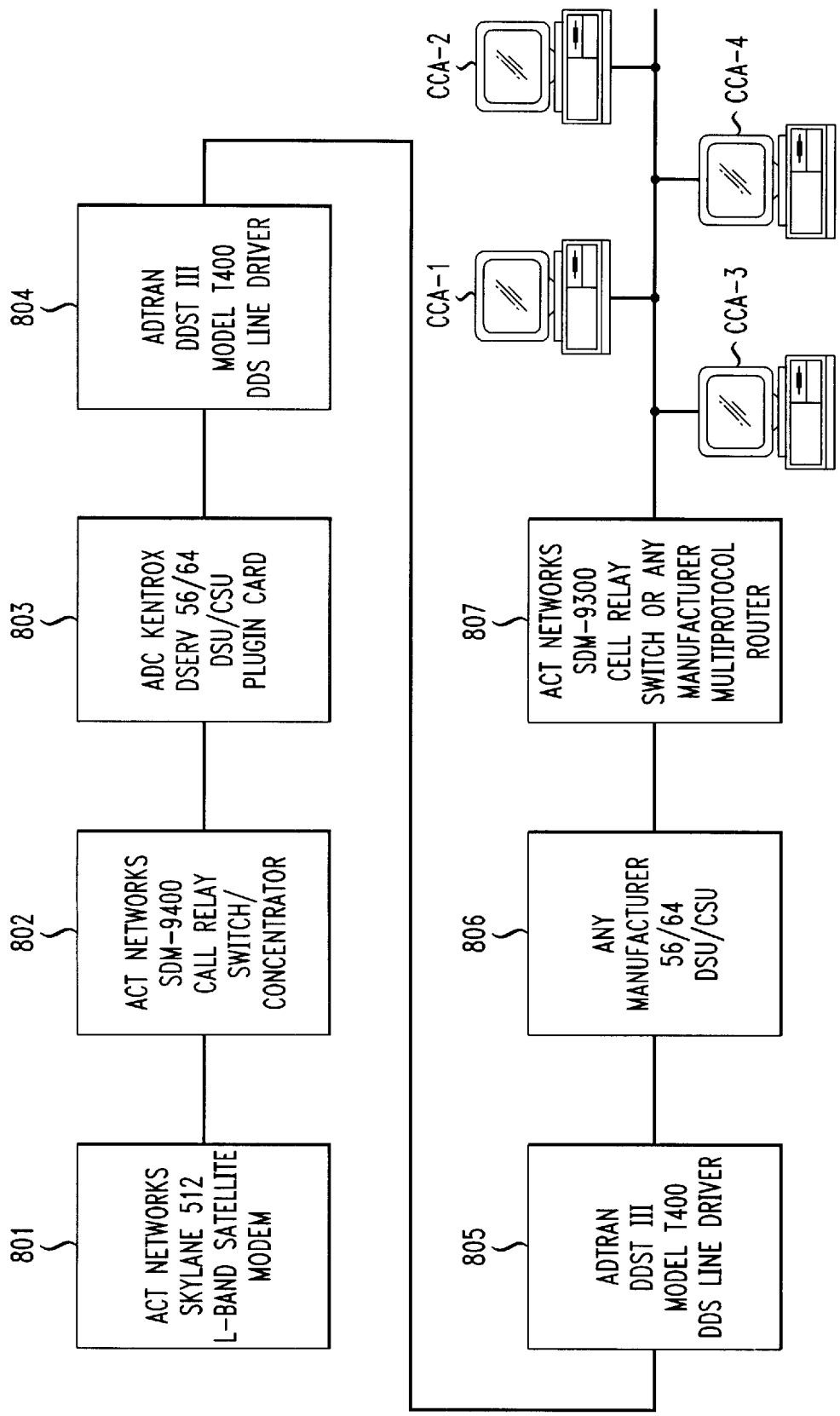
FIG. 8 provides a circuit provisioning view of a cell relay service delivery to a remote village via satellite.

Referring to FIG. 8, there is shown one system embodiment involving the delivery of cell relay data services to remote outposts in which the present invention may be utilized. Starting at the upper right of the drawing, a satellite downlink may comprise an ACT Networks SkyLane 512 L-band satellite modem 801. The modem 801 is coupled by a cross-over cable to an ACT Networks SDM-9400 cell relay switch/concentrator 802. Switch 802 corresponds to edge switch 110 that may be programmed in accordance with the above description to open virtual flow control channels with a router. Continuing an analogy with FIG. 1, data service unit/channel service unit (DSU/CSU) card 803 may comprise an ADC Kentrox DSERV 56/64 kbps DSU/CSU which corresponds to CSU/DSU card 108 in FIG. 1. Line drivers are not shown in FIG. 1 for simplicity since they are not relevant to congestion. These may comprise ADTRAN DDST III line drivers 804 (network side) and 805 (side) respectively. At the premise, any manufacturer DSU/CSU may be used as card 806 and any protocol router 807 may be used as router 807. The input to card 806 from driver 805 is typically an RJ 45 connector. The output from card 806 to router 807 is typically a Winchester DB 25, V.35 34-pin connector. Preferably, router 807 may be programmed to communicate with edge switch 802 and vice versa in a standard, consistent manner. It would not be desirable if router 807 refuses to set up a virtual control channel at least between protocol layers N and N−2 or N+2. As per the drawing, the router 807 is an ACT Networks SDM-9300 cell relay switch. In this manner, 56 kbps Internet service and 64 kbps voice/data services may be provided to remote locations. This is not to suggest that higher bit rate services may not also be offered and congestion alleviated according to the present invention. The invention is equally suitable for higher bit rates including video conferencing rates of several hundred megabits per second.

FIG. 8 also shows the provision of common clocking of the elements of the cell relay network. Modem 801 takes the network clock from the satellite link and provides external clock to the serial link. Edge switch 802 takes the external clock on all connected ports and does not propagate the clock from port to port as it is important to obtain common clock. The DSU/CSU card provides clock to the DDS 4-wire circuit and is set to an internal clock. The premises equipment derives time from the DDS clock on the 4-wire circuit Finally, FIG. 8 shows a typical local area network comprising a plurality of work stations which may be UNIX based or other operating system based work stations, for example, Sun SPARC workstations CCA-1 to CCA-4. The work stations may be wired, wireless, 10 Base T or 100 Base T, or otherwise connected. They may comprise anything from palm computers to intelligent terminals, to personal computers, WEB TV set tops, laptops, or any other operating system control devices capable of data transmission.

Thus, there has been shown and described a system and method for providing interlayer flow control end-to-end where network congestion is sensed and edge switches and routers may be programmed to control flow through the network in response to congestion messages. The invention should only be deemed to be limited by the claims that follow.

Those skilled in the art will recognize that the edge switch as described above is not necessarily limited to a network edge switch and networkframe relay switch. Indeed, those skilled in the art will recognize that a router, a cross-connect switch, an ATM switch or other switching system could assume the role of a network edge switch and a network frame relay switch all of which hereafter are referred to as network elements and network data elements. In addition, those skilled in the art will recognize that a work station includes a personal computer but might also include virtually any type of data processing machine that can send and receive data. The term work station hereafter includes such other data processing machines Buffer memory and/or video memory hereafter also include semi-conductor memory but also includes magnetic disk storage devices as well as other types of read/write memory devices.

What I claim is:

1. Router responsive to a congestion message from a network, the router comprising a protocol stack for receiving the congestion message at a layer N, the router further including a controller having an operating system programmed in response to the receipt of a congestion message to generate an N+2 pass through packet protocol data unit for passage up the protocol stack to layer N+2, the protocol data unit for requesting a virtual control channel between layer N and layer N+2, said router further including buffer memory, operatively coupled to said router, buffering data for presentation.

2. The router as recited in claim 1 wherein said buffer memory is video display memory of said router.

3. The router of claim 2 wherein said video display memory of said router is operatively coupled to said layer N+2 protocol data unit of said router to receive therefrom data packets from said network.

4. The router as recited in claim 1 further having an associated work station, said work station including video display memory wherein data packets are stored in unused video display memory.

5. The router as recited in claim 4 wherein said N+2 protocol data unit of said router is operatively coupled to said video display memory of said work station so as to store data packets in unused memory of said video display memory of said work station.

6. The router as recited in claim 1 further having an associated edge switch, said edge switch including video display memory.

7. The router as recited in claim 6 wherein said N+2 protocol data unit of said router is operatively coupled to said video display memory of said edge switch so as to store data packets in said video display memory of said edge switch.

8. The router as recited in claim 2 wherein said congestion message comprises a forward congestion message transmitted by a network frame relay switch.

9. The router as recited in claim 5 wherein said congestion message comprises a forward congestion message transmitted by a network frame relay switch.

10. The router as recited in claim 2 wherein said congestion message comprises a backward congestion message transmitted by a network frame relay switch.

11. The router as recited in claim 5 wherein said congestion message comprises a backward explicit congestion message transmitted by a network frame relay switch.

12. The router as recited in claim 5 wherein said congestion message comprises a forward explicit congestion message transmitted by a network frame relay switch.

13. The router according to claim 5 wherein said protocol layer N comprises protocol layer 2 of a frame relay protocol.

14. Router according to claim 5 wherein said router comprises cell relay apparatus.

15. Router according to claim 5 wherein said router has an associated satellite link.

16. A router comprising a receiving protocol stack, a transmitting protocol stack, an operating system and a controller for operating said operating system, said controller being programmed for response to receipt of a congestion message wherein a congestion bit has changed stated from a no congestion indication to a congestion indication, said controller upon receipt of said congestion indicates in said receiving protocol stack for generation of an N+2 pass through packet at layer 2 of said transmitting protocol stack; said router being operatively coupled to a memory device for storing data packets for presentation.

17. The router as recited in claim 16 wherein said memory device is video memory of a work station.

18. The router as recited in claim 16 wherein said memory device is video memory of an edge switch coupled to said router device.

19. Router as recited in claim 16 wherein said congestion message comprises a backwards congestion message.

20. A method for managing data flow in a fast packet network comprising the steps of receiving a congestion indication message at layer N of a receiving protocol stack of a router, responsive to receipt of said congestion message, generating an N+2 pass through packet protocol data unit at layer N for transmission up said receiving protocol stack to layer N+2 to request the opening of a virtual data flow control channel, deciding responsive to receipt of said N+2 pass through packet protocol data unit at layer N+2 to establish said virtual data flow control channel, and storing data packets awaiting presentation to said fast packet network in a memory device operatively coupled to said protocol data unit.

* * * * *